2,865,781
Patented Dec. 23, 1958

2,865,781
PRODUCTION OF FINELY DIVIDED CALCIUM CARBONATE

Eugene Wainer, Cleveland Heights, Ohio, assignor, by mesne assignments, to The Sinclair Manufacturing Company, H. M. Sinclair, Jr., trustee, Toledo, Ohio, a partnership No Drawing. Application July 2, 1956
Serial No. 595,083

7 Claims. (Cl. 106—306)

This invention relates to the preparation of an improved pigment or filler. More particularly it relates to the preparation of compositions consisting of a finely divided calcium carbonate with minor amounts of calcium silicate in which the components are characterized by a color and particle size particularly suitable for an ultimate use as pigments or fillers in place of calcium carbonate in many known formulations.

In a previous application, Serial No. 489,792, filed February 21, 1955, by George Cunningham and John Finn, Jr., which issued September 11, 1956, as United States Patent 2,762,686, there was described a process for the purification of calcium carbonate. The process therein disclosed involves the formation of a melt containing impure calcium carbonate and at least one alkali-metal carbonate or hydroxide and the decantation of the melt into a limited amount of water in which the calcium carbonate is precipitated. Water-soluble impurities in the calcium carbonate are separated from the precipitated calcium carbonate by decantation. The precipitated product is a finely divided solid, generally useful as a pigment or filler but not sufficiently fine to be useful for applications where an extremely fine particle size is critical.

I have now discovered an improved procedure whereby the process described in the above identified patent may be modified to produce a product having a particle size which is considerably smaller than that heretofore obtainable.

Briefly, my improvement resides in the discovery that when small but nevertheless significant amounts of silica or an alkali-metal silicate or a mixture of such silica-yielding materials are incorporated in the melt containing calcium carbonate, the particle size of the calcium carbonate precipitated by quenching the melt in a limited amount of water is greatly reduced. The precipitate so produced consists predominately of calcium carbonate and contains minor amounts of calcium silicate, probably coprecipitaetd therewith.

In the practice of my invention, a fused melt is formed consisting essentially of an impure calcium carbonate material, such as a natural limestone, at least one alkali-metal carbonate and a silica content of up to 25% by weight of the limestone. The silica may be added either as an alkali silicate or as silica, or as a mixture of the two. The proportion of alkali-metal carbonate to calcium carbonate containing material does not appear to be critical and it is merely necessary to provide a sufficient amount of alkali-metal carbonate to dissolve all of the calcium carbonate. It has been found that roughly two parts by weight of alkali-metal carbonate will dissolve one part by weight of calcium carbonate.

After the molten ingredients have been maintained at a suitable temperature for a time sufficient to insure that the silica will be effective, the melt is decanted into a limited amount of water to precipitate finely divided calcium carbonate. Instead of water, an aqueous solution of alkali carbonate may be used, which is preferably saturated with respect to the alkali-metal carbonate. One such quench liquid which has been found to be suitable is the decanted liquid from a previous precipitation.

The following example will serve to further illustrate one method of practicing my invention and is to be construed as exemplary rather than as limitative.

Example

A mixture was prepared of 102.0 parts by weight of crude limestone, 72 parts by weight of soda ash and 252 parts by weight of potash. The mixture was divided into four equal portions by weight. Nothing was added to the first portion and to each of the remaining three portions, there were added amounts of sodium silicate ($Na_2SiO_3$), corresponding to approximately ½, 1 and 5% by weight of silica based on the weight of the mixture, or about 2, 4 and 20% by weight of silica based on the weight of the limestone in the mixture.

Each of the four mixtures was melted at about 900° C. in a magnesite crucible and held at that temperature for about 30 minutes, after which the melts were decanted in about 1000 parts by weight of water, a sufficient amount to dissolve the alkali metal compounds in the melt but not sufficient to dissolve an appreciable amount of the alkaline earth compounds present.

The resulting precipitates were examined by means of both an ordinary microscope and an electron microscope and it was found that the product with no silica addition was principally particles of about 1 micron size, and that with the stated additions of silica the particles size of the major portion of the product was decreased to between 0.1 and 0.3 micron.

In these and other experiments, it was found that the addition of as little as 0.5% silica as sodium silicate was effective in reducing the particle size of the calcium carbonate product and that larger amounts tended to further improve the production of fine particled size material. An addition of about 5–10% silica, based on the weight of the limestone, appeared to produce the optimum benefits. Larger additions were found to increase the viscosity of the batch unduly, with undesirable consequences on the melting and the mixing of the batch components and on the pouring of the batch. The addition of more than 25% silica appeared to produce no additional benefits.

In other experiments, mixtures of soda ash, impure limestone and silica sand in proportions varying from 2% silica and 25% silica based on the weight of the limestone and other mixtures of potash, impure limestone and silica sand were fused, with corresponding improvements in the particle size of the final calcium carbonate product. In general, additions of about 10% silica, by weight of the impure limestone, produced the most noticeable decrease in the particle size of the finished purified calcium carbonate.

Other crucible materials, such as nickel or platinum have been used in place of magnesite. With nickel, it became particularly noticeable that the temperature of the melt should not be permitted to rise above 900° C. for any appreciable interval of time. Optimum results were obtained with melt temperatures of between about 850° C. and 880° C., and it is believed that at higher temperatures, the calcium carbonate tends to decompose into $CaO$ and $CO_2$.

The alkali-metal carbonate content of the quench medium, resulting either from preparation of a solution of alkali-metal carbonate in water to serve as the liquid into which the melt is decanted or from the solution in plain water of the alkali-metal carbonate content of the melt, may be recovered in any of several ways. For example, after the calcium carbonate precipitate is separated from the quenching liquid, the separated liquid may be evaporated to dryness and the alkali carbonate content recovered in the form of a dry solid which is suitable for preparation of the next fused salt melt. Alternatively, the alkali-metal containing quench liquid may be repeatedly used in the quenching step until a super-saturated solution of the alkali-metal carbonate forms. A portion of the supersaturated liquid may be withdrawn from time to time and replaced with water, and the withdrawn portion may be cooled or concentrated in order to obtain the alkali-metal carbonate by crystallization therefrom. Other methods of recovering the alkali carbonate values will occur to those skilled in the art.

Having now described my invention in the manner required by the patent statutes, I desire to secure Letters Patent for the invention described in the following claims.

I claim:

1. In a proces for producing finely divided calcium carbonate in which a mixture is formed consisting of at least one alkali-metal carbonate and at least one calcium-carbonate-containing material; said mixture is maintained in the molten state at a temperature below 900° C. and above the melting point of the mixture for a time sufficient for the melt to become homogeneous; and then the melt is decanted into an aqueous quenching medium in which the amount of water is insufficient to dissolve an appreciable proportion of the calcium carbonate in the melt but is at least sufficient to dissolve the alkali metal compounds present; the improvement which comprises: incorporating in the melt a siliceous material of the group consisting of silica and alkali-metal silicates in an amount between 2% to 20% by weight, based on the weight of thte calcium-carbonate-containing material in the mixture, by addition of said siliceous material to the other melt-forming constituents; whereby the particle size of the calcium carbonate precipitated by decanting the melt into the aqueous quenching medium is substantially smaller than the size of the particles obtained by carrying out the process without the intentional addition of siliceous material in the amounts stated.

2. In a process for producing finely divided calcium carbonate in which a mixture is formed consisting of at least one alkali-metal carbonate and at least one calcium-carbonate-containing material, said mixture is maintained in the molten state at a temperature between 850° C. and 880° C. for a time sufficient for the melt to become homogeneous; and then the melt is decanted into an aqueous quenching medium in which the amount of water is insufficient to dissolve an appreciable proportion of the calcium carbonate in the melt but is at least sufficient to dissolve the alkali-metal compounds present; the improvement which comprises: incorporating in the melt a siliceous material of the group consisting of silica and alkali-melt silicates in an amount between 2% to 20% by weight, based on the weight of the calcium-carbonate-containing material in the mixture, by addition of said siliceous material to the other melt-forming constituents; whereby the particle size of the calcium carbonate precipitated by decanting the melt into the aqueous quenching medium is substantially smaller than the size of the particles obtained by carrying out the process without the intentional addition of siliceous material in the amounts stated.

3. In a process for producing finely divided calcium carbonate in which a mixture is formed consisting of at least one alkali-metal-carbonate and at least one calcium-carbonate-containing material; and said mixture is maintined in the molten state at a temperature below 900° C. and above the melting point of the mixture for a time sufficient for the melt to become homogeneous, and then the melt is decanted into an aqueous quenching medium in which the amount of water is insufficient to dissolve an appreciable proportion of the calcium carbonate in the melt but is at least sufficient to dissolve the alkali metal compounds present; the improvements which comprise: incorporating in the melt a siliceous material of the group consisting of silica and alkali-metal silicates in an amount between 2% to 20% by weight, based on the weight of the calcium-carbonate-containing material in the mixture, by addition of said siliceous material to the other melt-forming constituents; whereby the particle size of the calcium carbonate precipitated by decanting the melt into the aqueous quenching medium is substantially smaller than the size of the particles obtained by carrying out the process without the intentional addition of siliceous material in the amounts stated; and providing as the aqueous quenching medium, a solution of an alkali-metal carbonate, which is returned to the process in order to recover the alkali-metal carbonate content thereof, after separation of the precipitated calcium carbonate.

4. In a process for producing finely divided calcium carbonate in which a mixture is formed consisting of at least one alkali-metal carbonate and at least one calcium-carbonate-containing material; said mixture is maintained in the molten state at a temperature below 900° C. and above the melting point of the mixture for a time sufficient for the melt to become homogeneous; and then the melt is decanted into an aqueous quenching medium in which the amount of water is insufficient to dissolve an appreciable proportion of the calcium carbonate in the melt but is at least sufficient to dissolve the alkali-metal compounds present; the improvement which comprises: providing between about 5% and 10% in the melt of a siliceous material of the group consisting of silica and alkali-metal silicates, based on the weight of the calcium-carbonate-containing material in the mixture, by addition of said siliceous material to the other melt-forming constituents, whereby the particle size of the calcium carbonate precipitated by decanting the melt into the aqueous quenching medium is substantially smaller than the size of the particles obtained by carrying out the process without the intentional addition of siliceous material.

5. In a process for producing finely divided calcium carbonate in which a mixture is formed consisting of sodium carbonate and an impure limestone; said mixture is maintained in the molten state at a temperature between about 850° C. and 880° C. for a time sufficient for the melt ot become homogeneous; and then the melt is decanted into an aqueous quenching medium in which the amount of water is insufficient to dissolve an appreciable proportion of the calcium carbonate in the melt but is at least sufficient to dissolve the alkali-metal compounds present; the improvement which comprises: incorporating in the melt between about 5% and 10% by weight of a siliceous material of the group consisting of silica and alkali-metal silicates, based on the weight of the impure limestone in the mixture, whereby the particle size of the calcium carbonate precipitated by decanting the melt into the aqueous quenching medium is substantially smaller than the size of the particles obtained by carrying out the process without the intentional addition of siliceous material.

6. The process of claim 5 further modified in that the aqueous quenching medium is a solution of an alkali-metal carbonate.

7. A process for producing a finely divided filler comprising a coprecipitate of calcium carbonate and calcium silicate which comprises: forming a molten bath consisting essentially of at least one alkali-metal carbonate and a calcium carbonate containing material and containing as an additionally added constituent, between about 2% and 20% by weight of a siliceous material of the group consisting of silica and alkali-metal silicates, based on the weight of the calcium-carbonate-containing material; maintaining the bath at a temperature above its melting point and below 900° C. for a time sufficient to form a homogeneous melt; decanting the melt into an aqueous quenching medium, whereby a calcium carbonate-calcium silicate coprecipitate is formed; and separating the coprecipitate solid product from the liquid aqueous quenching medium.

References Cited in the file of this patent

UNITED STATES PATENTS 2,762,686     Cunningham et al. _____ Sept. 11, 1956

OTHER REFERENCES

Thorpe's Dictionary of Applied Chemistry, fourth edition, 1946, vol. 7, page 312.

Thorpe's Dictionary of Applied Chemistry, fourth edition, 1940, vol. 4, page 54.